Figure 1A:
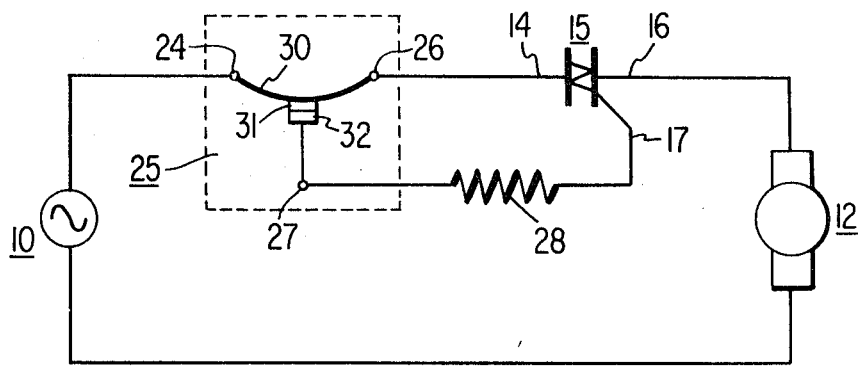

United States Patent

[11] 3,600,635

[72] Inventor John Manning Savidge Neilson
Norristown, Pa.
[21] Appl. No. 841,766
[22] Filed July 15, 1969
[45] Patented Aug. 17, 1971
[73] Assignee RCA Corporation

[54] PROTECTION CIRCUIT INCLUDING A THYRISTOR AND A THREE TERMINAL DEVICE
5 Claims, 5 Drawing Figs.

[52] U.S. Cl. .................................................... 317/33 SC,
307/39, 307/305, 317/13 C, 317/40 R
[51] Int. Cl. ..................................................... H02h 3/08
[50] Field of Search ........................................... 321/45 DT;
317/33 SC, 41, 13.3, 40; 307/305, 305 A, 32, 39

[56] References Cited
UNITED STATES PATENTS
3,207,875 9/1965 Bagnall et al. ................. 317/40 X
3,501,677 3/1970 Hurtle .......................... 317/33
OTHER REFERENCES
Galloway, " Application Note" by General Electric, 200.35, March, 1966; p. 6.

Primary Examiner—James D. Trammell
Attorney—Edward J. Norton

ABSTRACT: A three terminal device containing a pair of mechanical contacts is placed in circuit with a thyristor and a load to be supplied; the mechanical contacts are adapted to respond to the current supplied to the load to determine the presence or absence of a triggering signal at the control electrode of the thyristor.

PROTECTION CIRCUIT INCLUDING A THYRISTOR AND A THREE TERMINAL DEVICE

This invention relates to protection circuits, and, more particularly, to protection circuits for discontinuing the supply of current to a load when it exceeds a predetermined magnitude.

Conventional AC circuits often require the inclusion of circuit breaking means which operate to protect the load from excessive currents. For example, in supplying power to a motor load it is necessary to protect the motor from overload currents which may occur in the event of motor stall or locked rotor operation. Such overload currents will often reach magnitudes of from six to 10 times normal load current. Sustained operation under such conditions will cause the windings of the motor under load to burn out. In the prior art, fuses, thermal cutouts and similar protective devices have been successfully employed to overcome this problem. These devices suffer from the need of continual maintenance due to pitted contacts occuring as a result of full load interruption or, in the case of fuses, from the need for replacement due to burn out.

Accordingly, it is an object of the present invention to provide a simple, inexpensive circuit breaking element which can operate indefinitely, with a minimum of maintenance.

It is a further object of the present invention to provide a protection circuit, including such an element in combination with a thyristor, wherein excessive load currents are interrupted by the mode of operation of the thyristor.

A circuit breaking element in accordance with the present invention comprises a three terminal device adapted to sense the current flow between first and second terminals thereof, said device including a pair of mechanical contacts capable of being opened and closed, one contact of said pair connected to the third terminal of said device, the remaining contact of said pair coupled to said current path, the magnitude of said current through said current path determining the position of said contacts.

A protection circuit adapted to sense overload conditions of a load and discontinue the supply of power thereto as a result thereof, in accordance with the present invention, comprises a thyristor having first and second main terminal electrodes and a control electrode, said thyristor having current conducting and current nonconducting modes of operation, the operational mode of said thyristor defining the presence or absence of current to said load; and, a three terminal device connected in circuit with said thyristor and said load, said device adapted to sense the current supplied to the load via two terminals thereof and to permit or prevent the application of a triggering signal to the control electrode of said thyristor via the third terminal of said device in accordance with the magnitude of said current.

The present invention will be more fully understood upon reading the specification herein along with the accompanying drawing, the figures of which depict protection circuits in accordance with embodiments of the present invention.

Figure 1B:
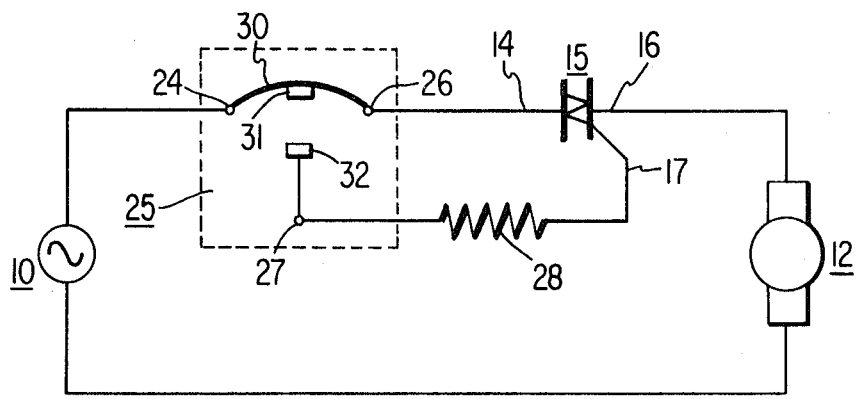

Turning to a description of FIGS. 1a and 1b, the main terminal electrodes 14, 16 of a thyristor 15, e.g. a Triac, are connected in series circuit with the load 12 to be supplied and a source of alternating current 10. A three terminal device 25 is connected in series circuit with the AC source 10, the Triac 15, and the load 12, via its first and second terminals 24, 26. The third terminal 27 of the device 25 is connected to the control electrode 17 of the Triac 15 via resistor 28. As shown in FIGS. 1a and 1b, the three terminal device 25 includes a bimetallic strip 30 disposed intermediate its first and second terminals 24, 26; the strip 30 having mounted thereon one 31 of a pair of mechanical contacts, the second contact 32 of the pair being connected to the third terminal 27 of the device. In the embodiment depicted in FIGS. 1a and 1b the bimetallic strip 30 is disposed intermediate terminals 24, 26 such that when its temperature is below a predetermined value it is positioned as shown in FIG. 1a with the contact pair 31, 32 in a closed position.

FIG. 1a is representative of circuit operation under normal operating conditions. At the beginning of each half cycle of applied alternating current the Triac 15 is triggered into conduction by a triggering signal supplied to its control electrode 17 from the AC source 10 via resistor 28 and terminal 27 of the three terminal device 25.

In the event of a current overload within the load 12 the bimetallic strip 30 connecting terminals 24 and 26 of the three terminal device 25 will be deflected as shown in FIG. 1b due to a rise in its temperature resulting from the increased current passing therethrough, thereby causing contacts 31 and 32 to become separated. This operates to disconnect the control electrode 17 of Triac 15 from the AC source 10 which normally provides the triggering signal thereto, thereby preventing the Triac from switching into a conducting mode. Since the contacts 31, 32 need interrupt no more than the small amounts of current necessary to trigger the Triac into conduction, they will last for an indefinite period of time with only a minimum amount of maintenance. Moreover, the need for any appreciable current interruption is unlikely since even the small amount of current necessary to trigger the Triac into conduction is only flowing in the control electrode circuit at the beginning of each half cycle of AC prior to the instant of Triac turn on.

Figure 2:
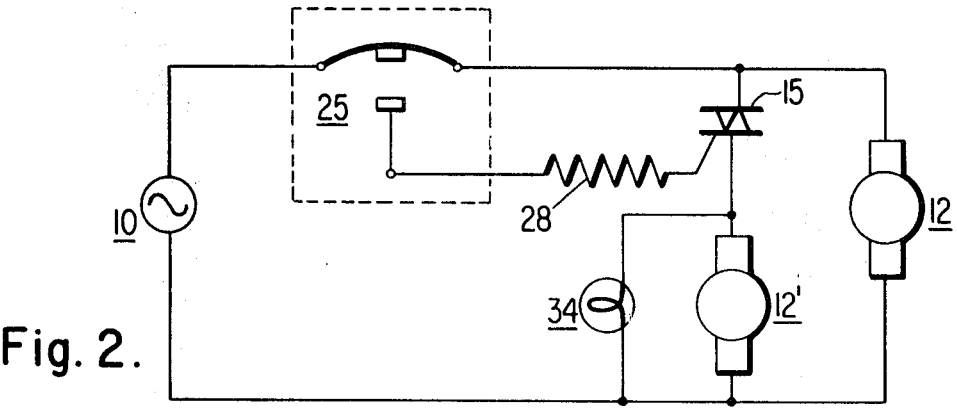

In the embodiment represented by FIGS. 1a and 1b the Triac is placed in series circuit with the load. FIG. 2 is representative of an alternate embodiment wherein the Triac 15 is connected substantially in shunt with the load 12 to be protected. In this embodiment the bimetallic strip is disposed such that when its temperature is below a predetermined value it is positioned as shown in FIG. 2 with the contact pair in an open position. Accordingly, the Triac 15 is normally prevented from becoming conductive due to the absence of a triggering signal at its control electrode. When the temperature of the bimetallic strip rises beyond the predetermined value due to increased current flow therethrough, it will be deflected to cause a closure of the contacts thereby resulting in the application of a triggering signal to the control electrode of the Triac. To prevent Triac damage a limiting impedance is placed in series with the voltage source to keep the short circuit current within the safe operating range of the Triac. When the Triac turns on, current is diverted from the load through the limiting impedance. In FIG. 2, for example, a secondary motor 12' is connected in series with the Triac and is cut into service by the Triac when the load upon the primary motor becomes excessive. As a further example a warning device 34 may be included in this secondary path to indicate the presence of an overload condition in the primary load path.

Figure 3:
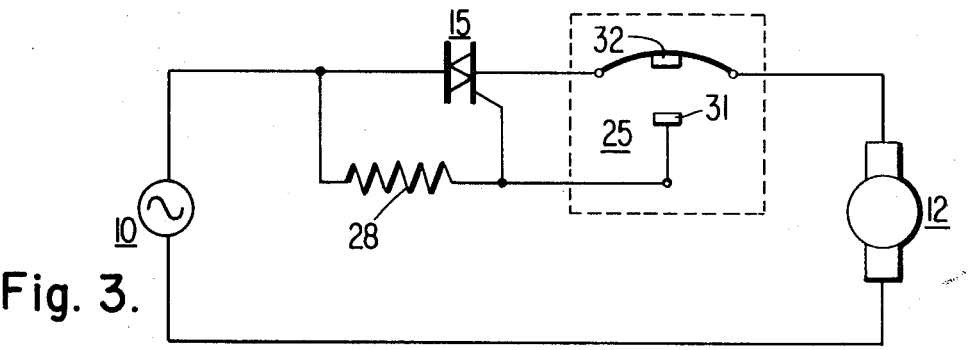
Figure 4:
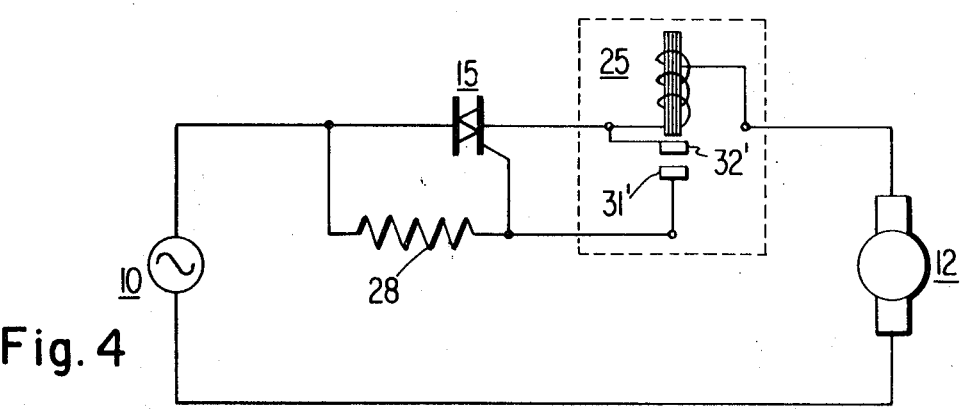

In the embodiments represented by FIGS. 3 and 4 the Triac is normally switched into operation via a triggering signal supplied from the AC source via the gating resistor 28; the contacts 31, 32 of the three terminal breaker 25 being normally open. In the event of overload, the breaker contacts are closed thereby shorting out the gating circuit and preventing the Triac from becoming conductive. Current supplied to the load 12 is thereafter restricted by the impedance of the gating resistor 28. FIG. 4 is illustrative of an embodiment utilizing magnetically activated breaker contacts 31', 32' as opposed to the thermally activated breaker contacts 31, 32 depicted in FIGS. 1—3. In either event the breaker can be designed to be self resetting such that it returns to its original position after a desired interval or, alternatively can be designed to latch until manually reset.

I claim:

1. A protection circuit connected to a source of power and adapted to sense overload conditions of a first load and for rendering a second load operative for relieving said overload conditions, comprising:

a thyristor having first and second main electrodes and a control electrode, the main electrodes of said thyristor being connected in series circuit with said second load and said source, said first load being connected in parallel circuit with said thyristor and said second load;

a three terminal device connected in circuit with said source and said first load, said device adapted to sense the current supplied to said first load via two terminals thereof and to permit or prevent the application of a triggering signal to the control electrode of said thyristor via the third terminal of said device in accordance with the magnitude of the current supplied to said first load.

2. A protection circuit as defined in claim 1 wherein said three terminal device includes a pair of mechanical contacts in series with the third terminal thereof, said pair of contacts having an opened and a closed position, the position of said contacts being responsive to the current supplied to the load to determine the presence of absence of a triggering signal at the control electrode of said thyristor.

3. A protection circuit as defined in claim 2 wherein said contacts are thermally operated.

4. A protection circuit as defined in claim 2 wherein said contacts are magnetically operated.

5. A protection circuit as defined in claim 2 wherein said three terminal device comprises a bimetallic strip intermediate said first and second terminals thereof and a pair of mechanical contacts, one of said contacts connected to said bimetallic strip and the other of said contacts connected to said third terminal, the deflection of said bimetallic strip caused by a current flow therethrough above a particular magnitude operating to connect said pair of contacts and cause the application of a triggering signal to the control electrode of said thyristor via said third terminal.